United States Patent [19]

Heimbeck

[11] Patent Number: 5,005,960
[45] Date of Patent: Apr. 9, 1991

[54] RELAY LENS SYSTEM WITH FOUR OPTICAL ELEMENTS IN SYMMETRICAL ARRANGEMENT

[75] Inventor: Hans J. Heimbeck, Gallen, Switzerland

[73] Assignee: Med Inventio AG, Zurich, Switzerland

[21] Appl. No.: 278,923

[22] PCT Filed: Mar. 17, 1988

[86] PCT No.: PCT/EP88/00218
§ 371 Date: Nov. 21, 1989
§ 102(e) Date: Nov. 21, 1989

[87] PCT Pub. No.: WO88/07218
PCT Pub. Date: Sep. 22, 1988

[30] Foreign Application Priority Data

Mar. 19, 1987 [DE] Fed. Rep. of Germany ....... 3709021

[51] Int. Cl.$^5$ .......................... G02B 9/34; G02B 23/00; G02B 23/24
[52] U.S. Cl. ...................................... 350/573; 350/469
[58] Field of Search ............... 350/573, 572, 469, 470, 350/471, 447

[56] References Cited

U.S. PATENT DOCUMENTS 4,693,568 9/1987 Takahashi .......................... 350/573

FOREIGN PATENT DOCUMENTS 1443150 7/1976 United Kingdom ............... 350/573

Primary Examiner—Jon W. Henry
Attorney, Agent, or Firm—Evenson, Wands, Edwards, Lenahan & McKeown

[57] ABSTRACT

What is described here is a relay lens system, specifically for endoscopes or the like, comprising two rod-type lens elements and two further optical elements in symmetrical arrangement relative to the center plane of the object plane and the image plane.

The relay lens system according to the present invention is characterized by the fact that the rod-type lens elements are individual convex/concave optical elements and the further elements are individual bi-convex optical elements, and that one rod-type lens and one further lens, respectively, are bonded to each other.

This structure according to the present invention contributes to an enhanced compensation, specifically of the field curvature and astigmatism, while furnishing a brighter image.

13 Claims, 3 Drawing Sheets

RELAY LENS SYSTEM WITH FOUR OPTICAL ELEMENTS IN SYMMETRICAL ARRANGEMENT

BACKGROUND AND SUMMARY OF THE INVENTION

The present invention relates to a relay lens system comprising two rod-type lens elements and two further optical elements in symmetrical arrangement relative to the center plane of the object plane and the image plane, as defined in the introductory clause of patent claim 1.

Such relay lens systems, which are also termed image transfer systems, are used specifically in endoscopes and also for other types of periscopes such as technoscopes, cystoscopes, or the like. For this reason, the term "endoscope" will be used in the following as a "generic term" without any restriction of the general applicability of the invention.

The use of rod-type lens elements has been proposed for the first time by Prof. Hopkins (GB Patent No. 954 629): according to Prof. Hopkins' fundamental idea, each relay lens system—i.e. any lens system which transfers the image produced by the endoscope objective to the following relay lens system or the eyepiece—is composed of two bi-convex rod-type lenses or at least two additional meniscus lenses. The combination of rod-type bi-convex lenses with meniscus lenses contributes, on the one hand, to a high image brightness, while it is suited, on the other hand, to compensate sufficiently the optical aberrations which are troublesome in relay lens systems, i.e. astigmatism and curvature of field, as has been recognized by Prof. Hopkins.

Based on Prof. Hopkins' works, a number of modified relay lens systems has been described in patent literature thereafter, wherein rod-type lens elements are employed as well. The published German patent application No. DE-AS 25 54 952, the German patent No. 26 19 393, the published German patent application No. DE-OS 35 34 210, and the published German patent application No. DE-OS 35 35 028 should be mentioned here only by way of example.

Compared against Prof. Hopkins' fundamental idea, the relay lens or image transfer systems described in the foregoing patent documents are of a relatively complex design, aiming at an improved compensation of the aberrations in imaging.

The published German patent application No. DE-AS 25 54 952 proposes, for instance, the use of bonded elements as relay lenses, with insertion of optical flats between the field lenses and the relay lenses. This arrangement not only increases the number of required optical elements but also renders the mechanical structure of the endoscope more expensive as all the optical elements are separated from each other by air gaps.

The German patent No. 26 19 393 describes the use of a total of four rod-type lenses, partly consisting of bonded elements, and a fluid lens in each relay lens system. More detailed comments upon the high costs of production of such a structure may be dispended with here.

The published German patent application No. DE-OS 35 34 210 describes as well the use of "thick" meniscus lenses in addition to the bi-convex rod-type lenses, wherein either the rod-type lenses or the thick meniscus lenses are designed as bonded elements.

According to the most recent idea proposed in the above-referenced documents, i.e. DE-OS No. 35 35 028, each relay lens group comprises even five lens elements part of which is additionally designed as bonded elements.

None of these more recent publications, however, mentions a reasonable relationship between the achieved improvements of both the imaging quality and the image brightness, and the increased production costs.

Moreover, quite a number of publications discuss measures to increase the cross-sectional area available for the path of rays and thus the image brightness with a given diameter of the endoscope or periscope, respectively. The common fundamental idea which can be taken from these publications consists in rendering spacers between all lenses superfluous in order to make the cross-sectional area occupied by the spacers available as well for the beam of rays.

The published German patent application No. DE-AS 23 05 473 therefore includes the idea of designing the relay lens system(s) of the endoscope in a way that a maximum of two air/glass interfaces only will be available for all the image reversions or at least for each image reversion. Such a design of a relay lens system, however, requires a great number of bonded areas so that the production costs are correspondingly high.

The published German patent application No. DE-AS 25 56 717 suggests to allow all areas of the relay lens system to bear against each other so that the lens system must be fixed at the outside tube by its two extreme areas only. This design entails, however, the disadvantage that the lens areas may be moved relative to each other and thus may become marred due to the bending forces acting upon the endoscope, which inevitably occur in practice.

The present invention is based on the object of providing a relay or image transfer system for an endoscope or the like, which will furnish a bright image and is yet inexpensive in production while it provides for very well compensated image aberrations.

One solution of this problem in accordance with the present invention is characterized, together with its improvements, in the patent claims.

It is surprising that this problem can be solved, for instance, by starting from a "simple" relay lens system according to the introductory clause of patent claim 1 and by improving this lens system in a way that convex/concave optical elements are used for the rod-type lens elements while bi-convex optical elements are used for the further elements, with one rod-type lens and another lens, respectively, forming one bonded element.

This invention deviates, however, from the fundamental structure of an image transfer system as it has been common, without exception, since the filing date of the British patent No. 954 629, wherein bi-convex rod-type lenses were applied. In contrast thereto, however, the present invention is the first to use convex/concave rod-type lenses which are bonded or cemented to bi-convex lenses. From an optical viewpoint, the bi-convex lenses are not thick lenses in the inventive relay lens or image transfer system.

This novel basic design allows for an excellent compensation of astigmatism and field curvature with nothing else but a lens system of a comparatively simple structure comprising merely four lenses.

Even though a rod-type lens with a concave surface is known from the German patent No. 216,621, the image reversion system disclosed in that document has an entirely different structure wherein the concave surface is facing the atmosphere rather than being disposed on the side of the additional lens. Moreover, in that document the air lens formed between the rod-type lens and the field lens, where the intermediate image is formed, is essential of the correction of the imaging errors. In the relay lens system according to the present invention, on the other hand, the intermediate image is formed in the air so that such air lenses do not play any rôle whatsoever.

The dependent claims describe improvements of the present invention:

According to the measures specified in claim 2, an excellent chromatic correction can be achieved which is an essential aspect of the present invention.

According to claim 3 provisions are made for the biconvex lenses resting upon each other in the zone of their surface apex or being arranged at a very small distance from each other:

Due to this arrangement it has become possible to do without spacers or any other fasteners in the area of the plane of symmetry of the lens system, which is also the aperture plane, so that a larger cross-sectional area available for the beam and thus a brighter image will be obtained. As in contrast to prior art as known from the published German patent application No. DE-AS 25 56 717, a single glass seat only is provided in the aperture plane as well, scratches or mars which may be due to unavoidable bending stress of the endoscope, are by far less troublesome in the solution according to the present invention than they are in prior art devices. And yet, since the diameter of the image to be transferred is normally smaller than the endoscope diameter available, the same advantages are achieved, i.e. a brighter image due to the increased light intensity.

The optical flat provided according to claim 4 further enhances the compensation of image aberrations and permits a correction of the wave front without the necessity of providing optical flats between all lenses, as it is the case in the prior art systems. What is particularly advantageous here, too, is the envisaged glass seating since it renders spacers or other fasteners superfluous, while it increases the image brightness.

The novel structure according to the present invention, comprising convex/concave rod-type lenses, allows for compensation strategies which are completely different from the known strategies, opening up new possibilities which cannot be achieved with conventional lens systems.

One example is the compensation condition specified in claim 5, which when satisfied is particularly important for the compensation of the field curvature, and which contradicts the condition set forth in the published German patent application No. DE-OS 35 34 210.

The condition given in claim 6, too, further enhances the compensation of the field curvature.

The inventive measures defined in claim 1 allow, in particular, for the use of glass elements with a high refractive index and with a low difference in the refractive index (claim 7) so that a bright image can be achieved.

Above all, the structure of the lens system according to the present invention allows for using glass with a great difference in the Abbe numbers so that the inventive lens system has an excellent capability of correcting chromatic aberrations.

DETAILED DESCRIPTION OF THE DRAWINGS

Figure 1:
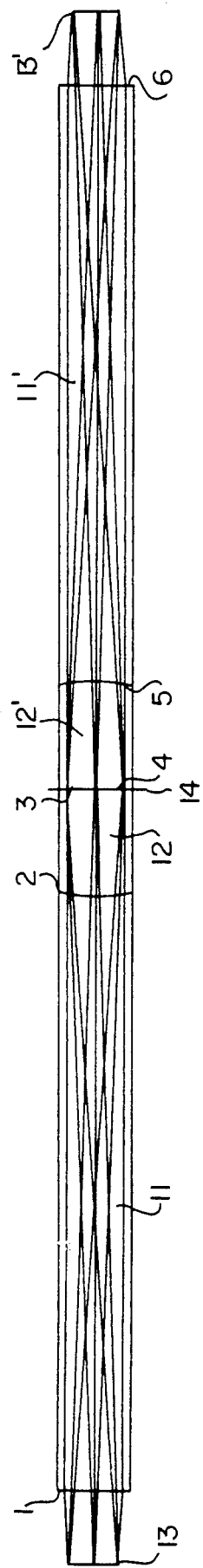
FIG. 1 illustrates a partial lens section through a relay lens system according to the present invention.

Referring to FIG. 1, the inventive lens system comprises two convex/concave rod-type lenses 11, and 11' and two bi-convex lenses 12 and 12' which project an image 13 at full scale (1:1) or at inverted full scale (1:1) onto an image plane 13' this image 13 being produced by an endoscope objective (not shown) or a relay lens system of similar design.

The numbering 1-6 of the individual surfaces of the lenses are as shown in the drawings.

The Tables 1 through 4, which are given in the following with reference to four embodiments, indicate the numerical values of the surface radii, the lens thickness or the air gaps (identified by n=1) between these surface radii, and the refractive indices, together with the Abbe numbers for the d-line), of the individual glass materials.

The given values have been rounded each to one or two positions after the decimal point, respectively; in reality, these figures are calculated, of course, with a higher accuracy. The radii and the spaces are indicated in millimeters. With these values chosen, the relay lens system is specifically suited for an endoscope. Other dimensions are naturally possible as well.

Moreover, the path which the rays follow between the object plane 13 and the aperture plane 14 is entered in figures.

TABLE 1

| Surface | Radius | Thickness | Refractive Index | Abbe Number |
|---|---|---|---|---|
| 1 | 13.3 | 26.66 | 1.85 | 23.8 |
| 2 | 8.04 | 2.3 | 1.81 | 31.6 |
| 3 | −14.4 | 0 | 1 | |
| 4 | 14.4 | 2.3 | 1.81 | 31.6 |
| 5 | −8.04 | 26.66 | 1.85 | 23.8 |
| 6 | −13.3 | | | |

TABLE 2

| Surface | Radius | Thickness | Refractive Index | Abbe Number |
|---|---|---|---|---|
| 1 | 12.38 | 25.95 | 1.74 | 28.2 |
| 2 | 7.6 | 3.1 | 1.70 | 38.6 |
| 3 | −13.0 | 0 | 1 | |
| 4 | 13.0 | 3.1 | 1.70 | 38.6 |
| 5 | −7.6 | 25.95 | 1.74 | 28.2 |
| 6 | −12.38 | | | |

TABLE 3

| Surface | Radius | Thickness | Refractive Index | Abbe Number |
|---|---|---|---|---|
| 1 | 11.1 | 24.5 | 1.62 | 36.3 |
| 2 | 4.2 | 4.5 | 1.61 | 46.4 |
| 3 | −12.5 | 0 | 1 | |
| 4 | 12.5 | 4.5 | 1.61 | 46.4 |
| 5 | −4.2 | 24.5 | 1.62 | 36.3 |

TABLE 3-continued

| Surface | Radius | Thickness | Refractive Index | Abbe Number |
|---|---|---|---|---|
| 6 | −11.1 | | | |

TABLE 4

| Surface | Radius | Thickness | Refractive Index | Abbe Number |
|---|---|---|---|---|
| 1 | 11.1 | 28.1 | 1.62 | 36.3 |
| 2 | 6.9 | 0.9 | 1.59 | 48.4 |
| 3 | −11.6 | 0.01 | 1 | |
| 4 | 11.6 | 0.9 | 1.59 | 48.4 |
| 5 | −6.9 | 28.1 | 1.62 | 36.3 |
| 6 | −11.1 | | | |

The four embodiments are distinguished from each other by the respective selection of the glass types. In the embodiment of Table 1, only glasses are used whose refractive index is higher than 1.8. The application of exclusively high-refraction glasses is not possible in consideration of the present state of the art. The use of bonded elements with a slight difference in the refractive index is not common either in the prior art systems, even though they are made of optical crown or flint materials, respectively, and furnish an excellent chromatic correction.

Figure 2:
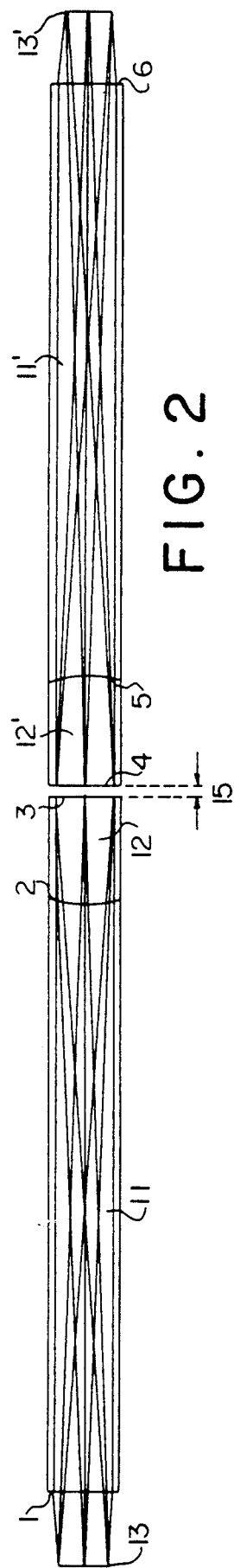
FIG. 2 illustrates a partial lens section through a relay lens system wherein the bi-convex lenses are separated by an air gap.
Figure 3:
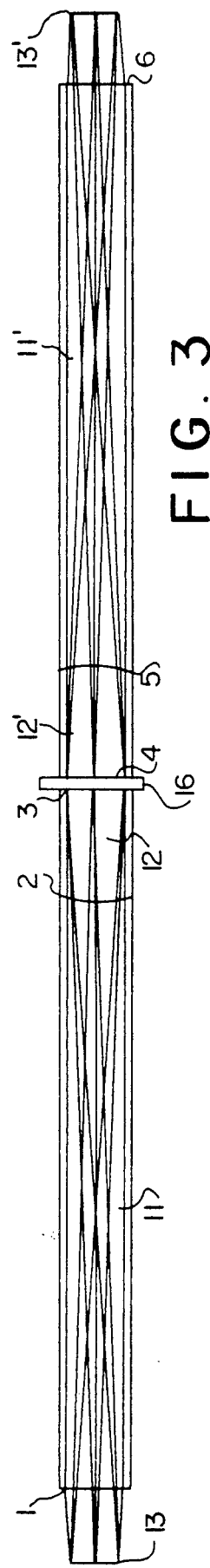
FIG. 3 illustrates a partial lens section through a relay lens system having an optical flat located between the bi-convex lenses.

Even though the invention has been described in the foregoing with reference to specific embodiments it does not restrict the general inventive idea which encompasses, of course, the most different modifications:

For instance, not only a small air gap 15 may be provided between the two bi-convex lenses, such as in the fourth embodiment shown in FIG. 2, but also a major air gap may be present. It is also possible to insert an optical flat 16 between the bi-convex lenses in order to provide for a further compensation of imaging aberrations as shown in FIG. 3.

Finally, reference should be made to the following fact: For reasons inherent in the production process it may be necessary to use several elements, e.g. an elongate cylindrical element, a planoconvex and a planoconcave element, both with ends bonded for fixing and made of the same glass material, to assemble the rod-type lenses. Lens systems comprising glass lenses made in such a way will, of course, come under the scope of protection covered by the patent claims.

What is claimed is:

1. Relay lens system for endoscopes, comprising two rod-type lens elements and two further optical elements therebetween in symmetrical arrangement relative to a center plane of symmetry between the two rod-type lens elements and two further optical elements, wherein the rod-type lens elements are individual convex/concave lens elements with concave surfaces which face the center plane, while the two further optical elements are individual bi-convex lens elements, one of said two rod-type lens elements and one of said two further optical elements being bonded to each other.

2. Lens system according to claim 1, wherein the following relationship applies for the Abbe number $v_{ds}$ of the rod-type lens elements and the Abbe number $v_{dw}$ of the further lens:

$$v_{dw} - v_{ds} > 6.$$

3. Lens system according to claim 1, wherein the further lenses rest upon each other in the area of their surface vertex.

4. Lens system according to claim 1, wherein an optical flat is provided in the area of the center plane of the lens system, the surface apeces of said further lenses resting upon said flat.

5. Lens system according to claim 1, wherein the following condition is satisfied:

$$f'*(\Theta_2 + \Theta_3 + \Theta_4) > 1$$

wherein:

$\Theta_2$ = refractive power of the concave surface of the rod-type lens, $\Theta_3$ = refractive power of the surface of the further lens, which is bonded to the concave surface, $\Theta_4$ = refractive power of the surface of the further lens, which faces the center plane, and f' = focal distance of the system composed of these three surfaces.

6. Lens system according to claim 1 wherein the following condition is satisfied:

$$n_w < n_s$$

wherein:

$n_w$ = refractive index of the further lens, and
$n_s$ = refractive index of the rod-type lens.

7. Lens system according to claim 6, wherein the following relationship applies:

$$0.01 < (n_s - n_w) < 0.06.$$

8. Lens system according to claim 1, characterized by the following data:

| Surface | Radius | Thickness | Refractive Index | Abbe Number |
|---|---|---|---|---|
| 1 | 13.3 | 26.66 | 1.85 | 23.8 |
| 2 | 8.04 | 2.3 | 1.81 | 31.6 |
| 3 | −14.4 | 0 | 1 | |
| 4 | 14.4 | 2.3 | 1.81 | 31.6 |
| 5 | −8.04 | 26.66 | 1.85 | 23.8 |
| 6 | −13.3 | | | |

9. Lens system according to claim 1, characterized by the following data:

| Surface | Radius | Thickness | Refractive Index | Abbe Number |
|---|---|---|---|---|
| 1 | 12.38 | 25.95 | 1.74 | 28.2 |
| 2 | 7.6 | 3.1 | 1.70 | 38.6 |
| 3 | −13.0 | 0 | 1 | |
| 4 | 13.0 | 3.1 | 1.70 | 38.6 |
| 5 | −7.6 | 25.95 | 1.74 | 28.2 |
| 6 | −12.38 | | | |

10. Lens system according to claim 1, characterized by the following data:

| Surface | Radius | Thickness | Refractive Index | Abbe Number |
|---|---|---|---|---|
| 1 | 11.1 | 24.5 | 1.62 | 36.3 |
| 2 | 4.2 | 4.5 | 1.61 | 46.4 |
| 3 | −12.5 | 0 | 1 | |
| 4 | 12.5 | 4.5 | 1.61 | 46.4 |
| 5 | −4.2 | 24.5 | 1.62 | 36.3 |

-continued

| Surface | Radius | Thickness | Refractive Index | Abbe Number |
|---|---|---|---|---|
| 6 | −11.1 | | | |

11. Lens system according to claim 1, characterized by the following data:

| Surface | Radius | Thickness | Refractive Index | Abbe Number |
|---|---|---|---|---|
| 1 | 11.1 | 28.1 | 1.62 | 36.3 |
| 2 | 6.9 | 0.9 | 1.59 | 48.4 |

-continued

| Surface | Radius | Thickness | Refractive Index | Abbe Number |
|---|---|---|---|---|
| 3 | −11.6 | 0.01 | 1 | |
| 4 | 11.6 | 0.9 | 1.59 | 48.4 |
| 5 | −6.9 | 28.1 | 1.62 | 36.3 |
| 6 | −11.1 | | | |

12. Lens system according to claim 1, wherein the following relationship applies for the Abbe number $v_{ds}$ of the rod-type lens elements and the Abbe number $v_{dw}$ of the further lenses:

$$v_{dw} - v_{ds} > 10.$$

13. Lens system according to claim 1, wherein the further lenses are mutually spaced by an air gap.

* * * * *